(12) United States Patent
Redding et al.

(10) Patent No.: US 10,564,042 B1
(45) Date of Patent: Feb. 18, 2020

(54) ADVANTAGES OF SPATIAL DEMODULATION IN INTERFEROMETRIC OPTICAL SENSING APPLICATIONS

(71) Applicant: The Government of the United States of America, as represented by the Secretary of the Navy, Washington, DC (US)

(72) Inventors: Brandon F. Redding, Alexandria, VA (US); Allen R. Davis, Falls Church, VA (US); Clay K. Kirkendall, Fairfax, VA (US); Anthony Dandridge, Fairfax Station, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/490,585

(22) Filed: Apr. 18, 2017

Related U.S. Application Data

(60) Provisional application No. 62/324,010, filed on Apr. 18, 2016.

(51) Int. Cl.
*G01B 9/02* (2006.01)
*G01J 9/02* (2006.01)

(52) U.S. Cl.
CPC .................................... *G01J 9/02* (2013.01)

(58) Field of Classification Search
CPC ..... G01B 9/02; G01J 11/00; G01J 9/02; G01J 9/0246; G01N 21/45
USPC ........................................................ 356/450
See application file for complete search history.

(56) References Cited

U.S. PATENT DOCUMENTS

| | | | | |
|---|---|---|---|---|
| 2005/0023434 | A1* | 2/2005 | Yacoubian | G01N 29/2418 250/200 |
| 2009/0073456 | A1* | 3/2009 | Wax | G01N 21/4795 356/479 |
| 2011/0032535 | A1* | 2/2011 | Liesener | G03F 7/70633 356/511 |
| 2011/0261368 | A1* | 10/2011 | Ohtomo | G01S 7/4812 356/607 |
| 2011/0310377 | A1* | 12/2011 | Ohishi | G01S 7/497 356/5.01 |
| 2012/0057149 | A1* | 3/2012 | Ohzawa | A61B 1/00147 356/51 |
| 2013/0107208 | A1* | 5/2013 | Endo | A61B 3/14 351/206 |
| 2014/0111671 | A1* | 4/2014 | Cao | G02B 27/48 348/241 |
| 2016/0113507 | A1* | 4/2016 | Reza | G01N 21/1717 356/477 |

(Continued)

*Primary Examiner* — Md M Rahman
(74) *Attorney, Agent, or Firm* — US Naval Research Laboratory; Richard F. Bis

(57) ABSTRACT

A method of interferometric optical sensing via spatial demodulation includes emitting a laser beam; splitting the laser beam into a reference beam and an interrogation beam; converting a desired signal into a change in the optical path of the interrogation beam via an optical sensor; and capturing the reference beam and the interrogation beam via a camera, wherein the interrogation beam is incident to the camera at a first angle and the reference beam is incident to the camera at a second angle different from the first angle, thereby causing an interference pattern at the camera.

8 Claims, 3 Drawing Sheets

(56) References Cited

U.S. PATENT DOCUMENTS

2016/0278636 A1* 9/2016 Fukuma ................ A61B 3/132
2016/0341545 A1* 11/2016 Yamazaki .......... G01B 9/02076
2018/0224266 A1* 8/2018 Perea ................ G01B 9/02032

* cited by examiner

ADVANTAGES OF SPATIAL DEMODULATION IN INTERFEROMETRIC OPTICAL SENSING APPLICATIONS

RELATED APPLICATIONS

This application claims the benefit of U.S. Provisional Application No. 62/324,010 filed Apr. 18, 2016, which is hereby incorporated herein by reference.

FIELD OF INVENTION

The present invention relates generally to optical sensing, and more particularly to spatial demodulation in interferometric optical sensing.

BACKGROUND

A wide range of optical sensing modalities rely on the ability to accurately measure the optical phase of an interrogating beam. This includes both fiber and free space sensors designed to measure a range of parameters which can be mapped to a change in the optical pathlength, including temperature, strain, pressure, acoustic signals, or magnetic fields. All of these systems rely on extracting the optical phase of an interrogation beam, and as a result, several methods have been developed to measure the phase. The most common techniques rely on either phase or frequency modulation and detection is performed using a single photodetector with a fast response time. Historically, this approach made sense due to the availability of low cost, high speed photodetectors.

SUMMARY OF INVENTION

With the recent development of increasingly sophisticated digital cameras, additional approaches to measuring the optical phase are now possible with exemplary techniques. Moreover, using a camera for detection enables massive reductions in the incoherent noise level of a measurement, which scales with the number of pixels. Thus, sensing using a megapixel camera can reduce the incoherent noise by a factor of 60 dB according to exemplary embodiments of the invention.

Although existing digital cameras offer impressive performance (e.g. megapixel images at ~25,000 frames/sec), and the performance is expected to improve with the increasing demand for high speed imaging, the detection bandwidth remains significantly lower than for a single photodetector. As a result, the massive reduction in the incoherent noise through pixel averaging comes with a trade-off of reduced bandwidth. It is therefore generally important to use as much of the available camera bandwidth as possible. While phase or frequency modulation could be applied to extract the phase in a camera sensing system, these approaches have significant disadvantages in terms of the detection bandwidth. Both phase and frequency modulation requires adding a carrier frequency, which itself is typically $\sim\frac{1}{8}^{th}$ of the detection bandwidth, and thus the highest measurable signal bandwidth is typically no better than $\frac{1}{16}^{th}$ of the original detector bandwidth. However, in exemplary embodiments using a camera for detection, the spatial domain may be used to extract the optical phase of the interrogation beam.

Exemplary embodiments use off-axis holography which enables single-shot phase measurements by measuring the interference fringes formed between a reference beam and the interrogation beam. Since this phase measurement is performed at base band, without the need for a carrier frequency, this allows the system to achieve the maximum bandwidth of the camera. Moreover, while off-axis holography reduces the amount of spatial information which can be collected in a single-shot, since the spatial coherence area of the interrogation beam must extend over multiple pixels in order to resolve the interference fringes, the incoherent noise reduction still scales as the number of pixels. Finally, exemplary approaches also benefit from added simplicity, since the spatial interference fringes can be introduced by tilting the reference beam with respect to the interrogation beam, alleviating the need for high speed phase or frequency modulation.

Spatial demodulation also reduces the sensitivity to Doppler noise. Since detection is performed at base-band, any low frequency motion remains at low frequencies, and does not degrade the ability of a spatially demodulated sensor to observe relatively high frequency signals. In contrast, Doppler noise has a far more deleterious effect on phase and frequency modulation schemes, since the low frequency Doppler signals are mapped onto the high frequency carrier and can interfere with the signal of interest or introduce aliasing artifacts.

According to one aspect of the invention, an optical sensor includes a laser source configured to emit a laser beam; a camera having a sensing surface; a beam splitter configured to split the laser beam into a reference beam and an interrogation beam; one or more optical elements configured to direct the interrogation beam at an optical sensing element and, subsequent to the optical sensing element, to the sensing surface of the camera, wherein the optical sensing element is configured to convert a desired signal to a change in the optical path of the interrogation beam; one or more optical elements configured to direct the reference beam to the sensing surface of the camera, wherein, the interrogation beam is incident upon the sensing surface of the camera at a first angle and the reference beam is incident upon the sensing surface of the camera at a second angle different from the first angle, thereby creating an interference pattern at the sensing surface.

Optionally, the first angle is normal to the sensor surface.

Optionally, the sensor includes a processor for extracting phase information of the interrogation beam via spatial demodulation.

Optionally, the processor is configured to perform a spatial Fourier transform of data from the camera converting raw data to spatial frequency components.

Optionally, the processor is configured to extract a subset of the spatial frequency components.

Optionally, the processor is configured to obtain amplitude and phase of the interrogation beam by performing an inverse Fourier transform of the spatial frequency components.

Optionally, the processor is configured to suppress incoherent noise and thereby obtain a time varying signal by averaging power spectral density from each pixel of the camera.

Optionally, sensor includes one or more neutral density filters configured to match the amplitude of the reference and interrogation beams.

Optionally, the sensing element is configured to reflect the interrogation beam towards the camera.

Optionally, the sensing element is configured to transmit the interrogation beam through the sensing element to the camera.

According to another aspect of the invention, a method of interferometric optical sensing via spatial demodulation includes the steps of: emitting a laser beam; splitting the laser beam into a reference beam and an interrogation beam; converting a desired signal into a change in the optical path of the interrogation beam via an optical sensor; and capturing the reference beam and the interrogation beam via a camera, wherein the reference beam is incident to the camera at a first angle and the interrogation beam is incident to the camera at a second angle different from the first angle, thereby causing an interference pattern at the camera.

Optionally, the first angle is normal to a sensor plane of the camera.

Optionally, the method includes the step of extracting phase information of the interrogation beam via spatial demodulation.

Optionally, the method includes the step of performing a spatial Fourier transform of data from the camera, thereby converting raw data to spatial frequency components.

Optionally, the method includes the step of extracting a subset of the spatial frequency components.

Optionally, the method includes the step of obtaining amplitude and phase of the interrogation beam by performing an inverse Fourier transform of the spatial frequency components.

Optionally, the method includes the step of suppressing incoherent noise and thereby obtain a time varying signal by averaging power spectral density from each pixel of the camera.

Optionally, the method includes the step of matching the amplitude of the reference and interrogation beams via one or more neutral density filters.

Optionally, the step of converting comprises reflecting the interrogation beam towards the camera.

Optionally, the step of converting comprises transmitting the interrogation beam through the sensing element to the camera.

The foregoing and other features of the invention are hereinafter described in greater detail with reference to the accompanying drawings.

DETAILED DESCRIPTION

Figure 1:
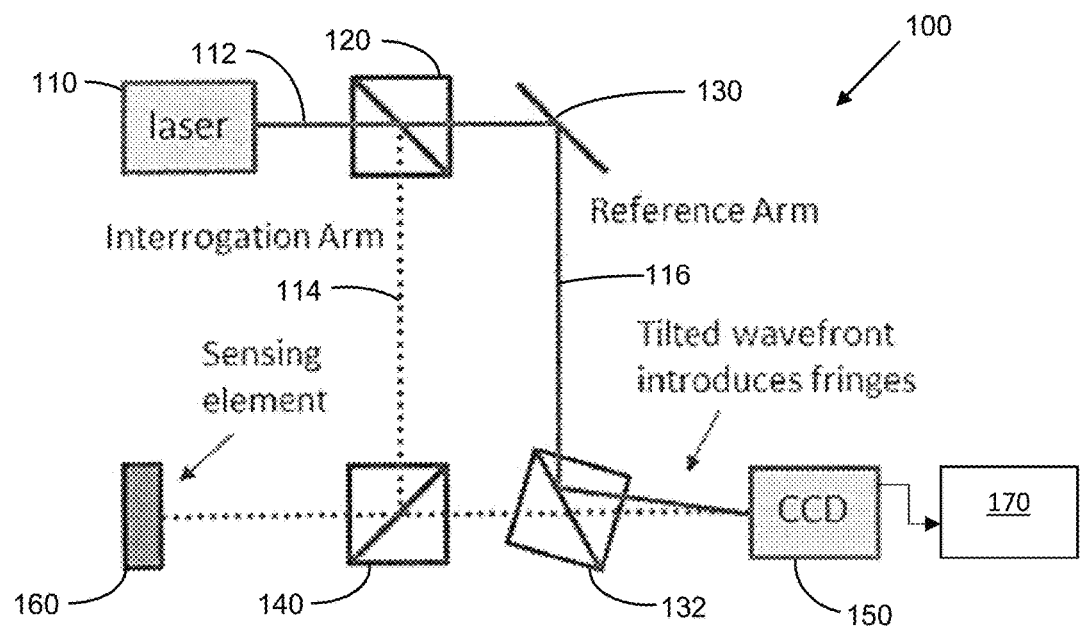
FIG. 1 shows a schematic diagram of an exemplary optical sensor using a reflection configuration.

A wide range of optical sensing systems rely on the precise measurement of the optical phase delay of an interrogation beam. Exemplary embodiments of the invention measure the optical phase using a spatial demodulation scheme based on off-axis holography, resulting in significant advantages in terms of both sensitivity and bandwidth. Off-axis holography relies on a digital camera to record the interference pattern formed between the interrogation beam and a reference beam which are combined at a fixed angle (hence the name "off-axis"). The optical phase of the interrogation beam is recovered through the spatial Fourier transform of this interference pattern, enabling single shot phase measurements without the need for a carrier frequency as in phase and frequency demodulation schemes. In this technique, incoherent noise is spread over all of the camera pixels, enabling a noise level reduction proportional to the number of pixels. For existing high speed megapixel cameras, this manifests as a noise reduction of up to 60 dB. In addition, the spatial demodulation technique is able to detect signals at up to half the bandwidth of the camera, as limited by the Nyquist criteria. Utilizing the maximum camera bandwidth is generally important with conventional cameras, since even the most sophisticated high-speed cameras cannot achieve the same bandwidth as individual photodetectors.

The advantages of exemplary spatial demodulation techniques could be realized in any optical sensing system relying on the precise measurement of the phase delay experienced by an interrogation beam. As such, exemplary approaches could improve the performance of optical sensors designed to measure temperature, strain, pressure, acoustic signals, or magnetic fields. Moreover, as the demand for high performance digital cameras continues to reduce costs while improving imaging speed and pixel counts, the advantages of spatial demodulation in optical sensing will become even more pronounced. Finally, while spatial demodulation is most readily accomplished using a "traditional" camera with thousands of pixels or more, it could also be performed using a camera having as few as four photodetectors. This could have advantages in applications requiring higher bandwidth than is available using existing "traditional" cameras. Such an approach would enable sensing up to the maximum detection bandwidth of the photodetectors, while providing a reduction in the incoherent noise proportional to the number of photodetectors used.

Spatial demodulation is achieved using off-axis holography to record the optical phase of an interrogation beam in an interferometer. An example configuration is shown schematically in FIG. 1 (showing a reflection geometry) and FIG. 2 (showing a transmission geometry. In both cases, the optical sensor relies on measuring the phase delay accumulated by the interrogation beam by interfering it with the reference beam. Interference fringes are formed across the camera by tilting the wavefront of the reference beam with respect to the interrogation beam.

Referring first to FIG. 1, an exemplary configuration 100 includes a laser source 110 directing a laser beam 112 at a beam splitter 120 causing the beam 112 to split into interrogation beam 114 and reference beam 116. Reference beam 116 is reflected by reflector 130 and reflector 132 causing reference beam 116 to strike camera 150 (optionally CMOS, CCD, etc.) at an oblique angle. Interrogation beam 114 is transmitted to a reflector 140 (which may be a half-silvered mirror, e.g.) which causes the interrogation beam 114 to become incident upon a sensing element 160. The sensing element converts the desired signal (e.g., temperature, strain, magnetic field, etc.) to a change in the optical path which will be measured as a phase delay on the camera 150. The interrogation beam 114 is reflected from the sensing element 160 towards the camera 150, possibly through the reflector 140 and the reflector 132, and at an angle different than the incident angle of the reference beam 116 (preferably normal to the surface of the camera 150). The interrogation beam 114 and reference beam 116 thereby create an interference pattern across the sensor of the camera 150. Processor 170 is configured to process the data collected by camera 150.

The laser source may be any appropriate source, for example a continuous wave (CW) laser. Experiments have been conducted with, for example, a CW laser providing 200 mW at a wavelength of 532 nm. Optionally, focusing elements may be included in the configuration where appropriate—for example, placed to focus the interrogation beam on the sensing element. The camera may be any appropriate camera, and experiments have been performed with a 384× 288 pixel camera capturing images at 25 kHz with a pixel well depth of 36,000 photoelectrons and a read-out noise of 23 electrons. Optionally, the laser may be attenuated to avoid saturating the camera, and additional neutral density (ND) filters may be added to the path of the reference beam to match the amplitude in the two beams.

Figure 2:
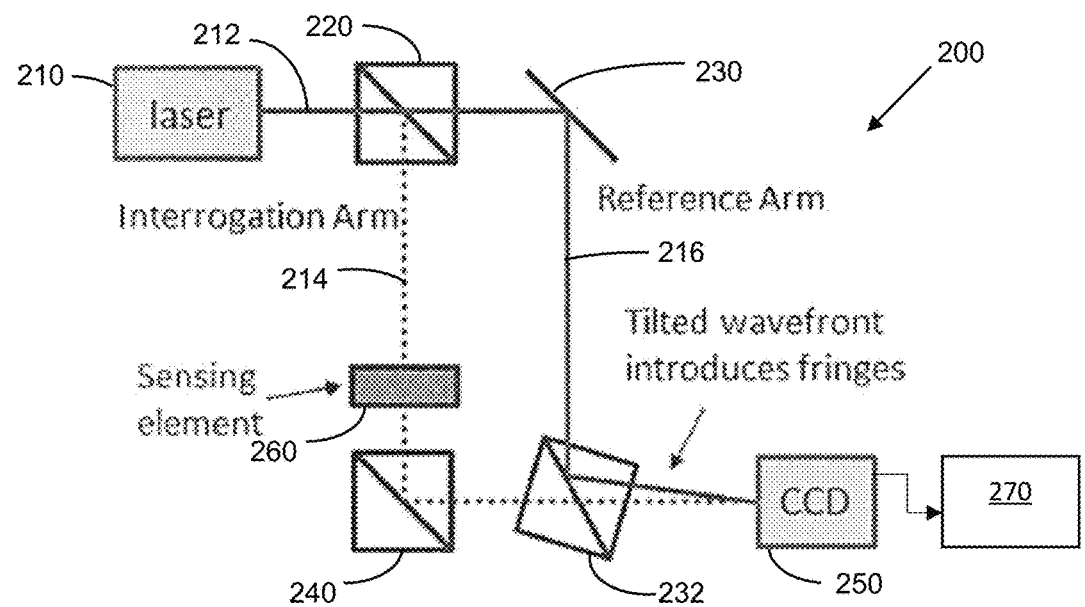
FIG. 2 shows a schematic diagram of an exemplary optical sensor using a transmission configuration.

Turning now to FIG. 2, an exemplary embodiment of the optical sensor is shown at 200. The optical sensor 200 is substantially the same as the above-referenced optical sensor 100, and consequently the same reference numerals but indexed by 100 are used to denote structures corresponding to similar structures in the optical sensor. In addition, the foregoing description of the sensor 100 is equally applicable to the sensor 200 except as noted below. Moreover, it will be appreciated upon reading and understanding the specification that aspects of the sensors may be substituted for one another or used in conjunction with one another where applicable.

In particular, the sensing element 260 may be placed in the path of interrogation beam 214 such that the sensing element 260 converts the desired signal to a change in the optical path via transmission of the beam through the sensing element rather than via reflection.

Figure 3:
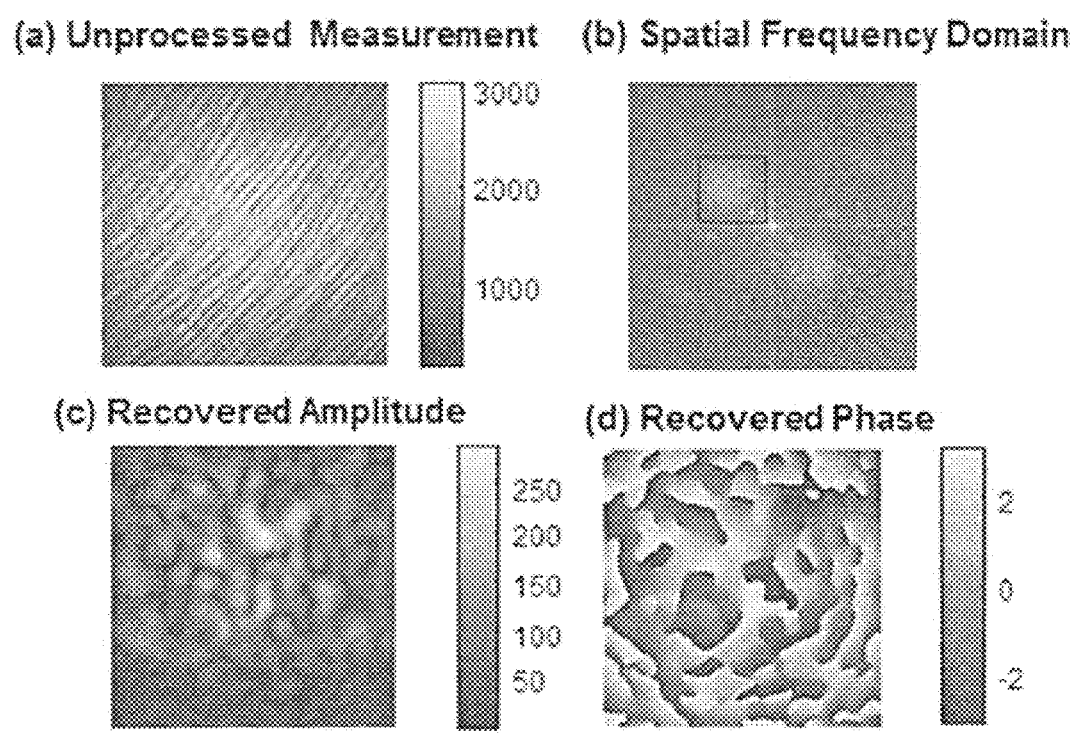
FIG. 3 shows an unprocessed interference image at (a) where the sensing element was a rough surface which produced a speckle pattern, the Fourier transform of the unprocessed image at (b) with the off-axis component indicated by the inset square, and the amplitude and phase of the interrogation beam recovered by inverse Fourier transform of the off-axis spatial frequency components at (c) and (d), respectively.

In exemplary configurations, the optical phase of the interrogation beam is then recovered by means of a spatial Fourier transform. This process is shown in FIG. 3. The unprocessed interference image is shown at (a) of a speckle pattern formed by light reflected off a rough surface. The spatial Fourier transform of the raw image is shown at (b) and a window was applied in the region indicated by the inset square such that the Fourier components outside the square were discarded. The amplitude and phase of the interrogation beam are then obtained by inverse Fourier transform of the spatial frequency components within the square, as shown at (c) and (d), respectively.

Figure 4:
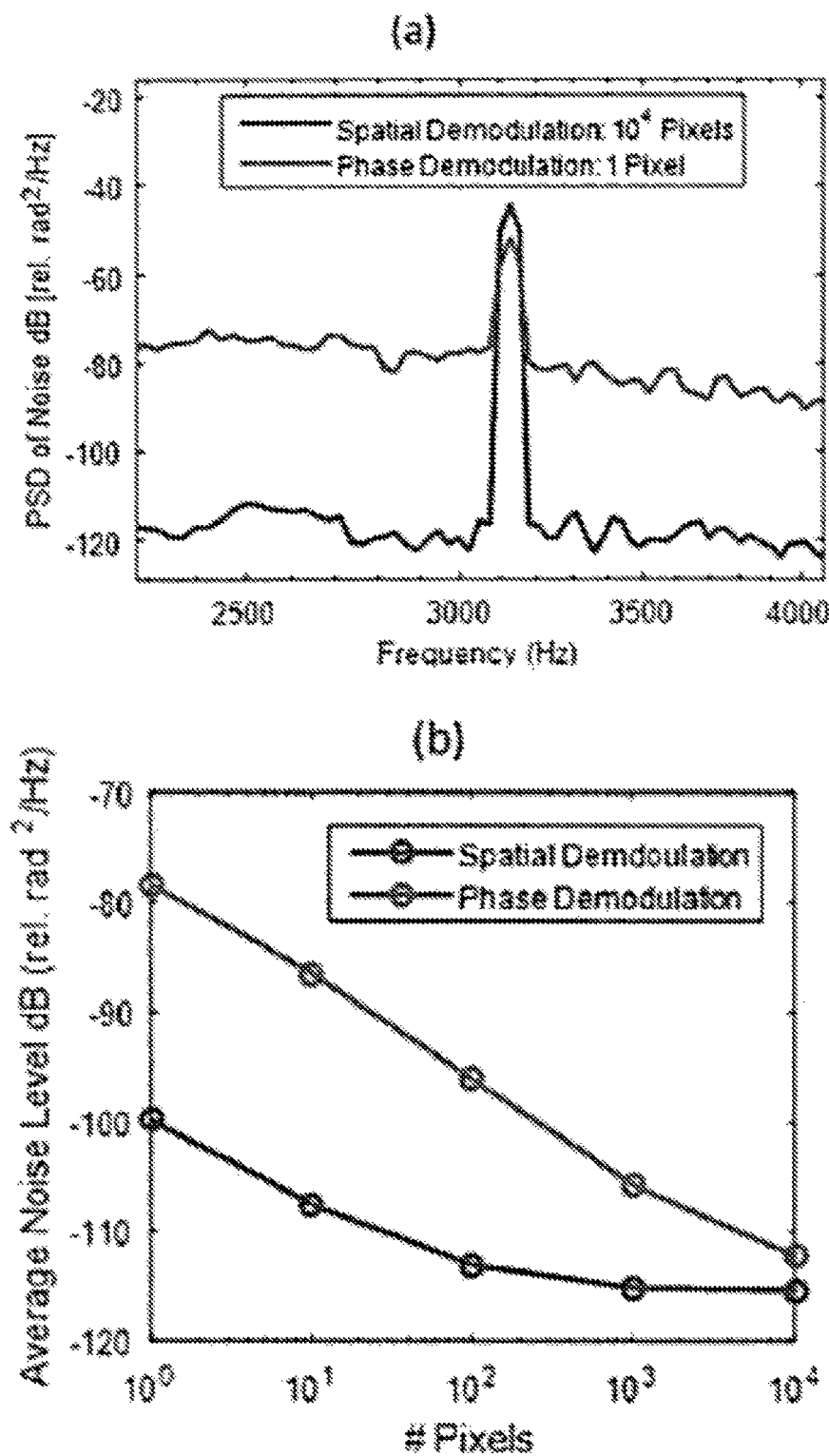
FIG. 4 shows at (a) the power spectral density (PSD) measurement of a signal at ~3 kHz using phase modulation and a single pixel detector compared with spatial modulation and $10^4$ pixels, and at (b) the average noise level is shown as a function of the number of pixels used.

To obtain a time varying signal, interference images such as the one in FIG. 3 at (a) are recorded at the camera frame rate and processed as in FIG. 3 to obtain the phase at each pixel for each frame. The time varying phase can then be evaluated at each pixel and the power spectral density from each pixel can be averaged to suppress the incoherent noise. To illustrate this, we used an electro-optic modulator to add a "signal" at ~3.1 kHz and used an exemplary spatial demodulation approach to measure this signal. Using a second electro-optic modulator, we also performed conventional phase modulation for comparison. As shown in FIG. 4 at (a), the noise level decreases by 40 dB when the power spectral density (PSD) is averaged over $10^4$ pixels. FIG. 4 at (b) shows the average noise level as a function of the number of pixels used to average the PSD using the two demodulation techniques. The phase modulation measurement allows us to show the linear scaling relationship between the number of pixels and the noise level. Exemplary spatial demodulation exhibits a lower noise level even with a single pixel used since the phase recovery process required averaging over many pixels to obtain the phase at a given pixel. As a result, the two approaches reach effectively the same noise level when all $10^4$ pixels are used. Of course, the spatial modulation approach also enables measurements at much higher frequency than the phase modulation approach.

The power spectral density (PSD) may be calculated as $$Y = \frac{1}{N_{pix} \cdot N_f} \sum_{N_{pix}} F[H \cdot \theta(r, t)] \qquad (1)$$

$$PSD = \frac{2Y \cdot Y^*}{\Delta f \cdot G_{HF}},$$

where F denotes the Fourier transform, H is a Hann window applied in the temporal domain, $N_{pix}$ is the number of pixels, $N_f$ is the number of recorded frames, $\Delta f$ is the frequency resolution [i.e., $\Delta f=1/(N_f \Delta t)$ where $\Delta t$ is the time between frames], and $G_{HF}$ is the noise gain factor associated with the Hann window and taken as $G_{HF}=0.375$. The PSD provides the phase noise in radians as a function of frequency, and Y* denotes the complex conjugate of Y. $\theta(r, t)$ denotes a measurement of the time-varying phase at each pixel.

The phase noise on each pixel, $\Delta\varphi$, may be dominated by shot noise, and can be estimated as $$\Delta\phi = \sqrt{\frac{2h\nu\Delta f}{V^2 \eta P_{total}}}, \qquad (2)$$

where h is Planck's constant, ν is the optical frequency, $\Delta f$ is the noise-equivalent bandwidth (taken to be 1 Hz), V is the interference fringe visibility, η is the quantum efficiency, and total is $P_{total}$ the average power reaching the detector.

Coherent detection allows achievement of shot-noise limited detection of the returning speckle field by increasing the reference arm amplitude to overcome the camera noise. Averaging the signal measured at N pixels provides an N fold reduction in the incoherent noise, in practice this represents a 40-60 dB noise reduction. Further, base-band, spatial demodulation (as opposed to frequency or phase demodulation techniques) allows detection of signals at frequencies up to half the camera frame rate; e.g., using COTS cameras, we can detect signals up to 10 kHz using 1 Mpixel for 60 dB noise reduction. Moreover, exemplary techniques provide Doppler suppression by direct phase detection which minimizes signal degradation due to low frequency motion. Also, exemplary embodiments provide experimental simplicity since spatial demodulation does not require adding a time-varying modulation using, for example an electro-optic or acousto-optic modulator.

Frequency and phase demodulation can also be performed using a camera and will provide the same N fold pixel reduction in the noise. However, these methods sacrifice a significant fraction of the camera bandwidth since the carrier is typically set at $\frac{1}{8}^{th}$ the camera frame rate and the highest measurable frequency is at best half of the carrier frequency. Thus, to achieve the same effective bandwidth as spatial demodulation, a higher frame rate is required which is generally only possible by reducing the number of pixels on the camera, which translates to less pixel averaging and reduced noise suppression. In addition, Doppler noise manifests as a broadening of the carrier signal in frequency and phase demodulation techniques which further reduces the detection sensitivity.

Other forms of spatial modulation than off-axis holography are also possible. For example, recording 4 images as the reference arm is phase stepped can also provide the phase information at each pixel; however this would also result in a reduced effective bandwidth. Note that in an imaging context, this reduced bandwidth is compensated by increasing the amount of image information which can be captured in a single frame compared with spatial demodulation. However, in the interferometric sensing context presented here, the pixels are used to reduce incoherent noise rather than to contain distinct information, mitigating the potential disadvantage of off-axis holography. Single shot phase stepping is also possible by producing four replicas of the image with varying phase delay and should provide similar performance to off-axis holography. Off-axis holography can also be achieved using a grating to impose a phase ramp on the reference arm rather than tilting the reference beam. This approach has potential advantages in maintaining high fringe contrast across the image, though this is more pronounced in high numerical aperture imaging systems or when using a light source with relatively low temporal or spatial coherence.

Various methods, apparatus, and/or computer program products according to example embodiments are described above. It will be understood that one or more units or steps, and combinations of steps and units, respectively, can be implemented by computer-executable program instructions. Likewise, some steps and units may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that are executed on the computer, processor, or other programmable data processing apparatus create means for implementing one or more functions specified in the steps or units described herein. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified herein. As an example, embodiments of the invention may provide for a computer program product, comprising a computer usable medium having a computer-readable program code or program instructions embodied therein, said computer-readable program code adapted to be executed to implement one or more functions specified herein. The computer program instructions may also be loaded onto a computer or other programmable data processing apparatus to cause a series of operational elements or steps to be performed on the computer or other programmable apparatus to produce a computer-implemented process such that the instructions that are executed on the computer or other programmable apparatus provide elements or steps for implementing the functions specified in the flow diagram block or blocks.

It will also be understood that each step or unit, and combinations of steps and/or units, can be implemented by special-purpose, hardware-based computer systems that perform the specified functions, elements or steps, or combinations of special purpose hardware and computer instructions.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical sensor comprising:
   a laser source configured to emit a laser beam;
   a camera having a sensing surface;
   a beam splitter configured to split the laser beam into a reference beam and an interrogation beam;
   one or more optical elements configured to direct the interrogation beam at an optical sensing element and, subsequent to the optical sensing element, to the sensing surface of the camera, wherein the optical sensing element is configured to convert a desired signal to a change in the optical path of the interrogation beam; and
   one or more optical elements configured to direct the reference beam to the sensing surface of the camera,
   wherein, the interrogation beam is incident upon the sensing surface of the camera at a first angle and the reference beam is incident upon the sensing surface of the camera at a second angle different from the first angle, thereby creating an interference pattern at the sensing surface; and
   a processor for extracting phase information of the interrogation beam via spatial demodulation;
   wherein the processor is configured to suppress incoherent noise and thereby obtain a time-varying signal by averaging power spectral density from each pixel of the camera.

2. The optical sensor of claim 1, wherein the first angle is normal to the sensor surface.

3. The optical sensor of claim 1, wherein the processor is configured to perform a spatial Fourier transform of data from the camera converting raw data to spatial frequency components.

4. The optical sensor of claim 3, wherein the processor is configured to extract a subset of the spatial frequency components.

5. The optical sensor of claim 4, wherein the processor is configured to obtain amplitude and phase of the interrogation beam by performing an inverse Fourier transform of the spatial frequency components.

6. The optical sensor of claim 1, further comprising one or more neutral density filters configured to match the amplitude of the reference and interrogation beams.

7. The optical sensor of claim 1, wherein the sensing element is configured to reflect the interrogation beam towards the camera.

8. The optical sensor of claim 1, wherein the sensing element is configured to transmit the interrogation beam through the sensing element to the camera.

\* \* \* \* \*